United States Patent [19]

Ayers

[11] Patent Number: 5,001,824
[45] Date of Patent: Mar. 26, 1991

[54] METHOD OF FLEXIBLY COUPLING A DRIVE SHAFT

[75] Inventor: Joe W. Ayers, Sherman, Tex.

[73] Assignee: Texas Instruments Incorporated, Dallas, Tex.

[21] Appl. No.: 402,171

[22] Filed: Sep. 1, 1989

Related U.S. Application Data

[62] Division of Ser. No. 91,188, Aug. 31, 1987, Pat. No. 4,881,922.

[51] Int. Cl.$^5$ ............................................. B23P 11/00
[52] U.S. Cl. ...................................... 29/436; 29/25.02; 414/8; 464/38; 464/79; 464/157; 901/25; 901/28
[58] Field of Search .................... 464/38, 39, 79, 157, 464/158, 102, 106; 403/380; 901/25, 28; 414/8; 29/569.1, 436

[56] References Cited

U.S. PATENT DOCUMENTS

| | | | |
|---|---|---|---|
| 1,126,219 | 1/1915 | Hupp | 464/38 |
| 2,914,929 | 12/1959 | Irons | 464/157 |
| 3,232,076 | 2/1966 | Sundt | 464/79 |
| 4,655,655 | 4/1987 | Schurfeld | 464/157 X |
| 4,721,492 | 1/1988 | Maurer | 464/38 |

FOREIGN PATENT DOCUMENTS 40707 of 1907 United Kingdom ................ 464/157

Primary Examiner—Carl E. Hall
Attorney, Agent, or Firm—B. Peter Barndt; James T. Comfort; Melvin Sharp

[57] ABSTRACT

In semiconductor vacuum processing, it is desirable to minimize the material handling mechanisms that must be located in the evacuated process chamber. To accomplish this, a mechanism has been designed that locates the necessary power elements such as motors (12-16) outside the chamber (32). Power is transmitted to the mechanism via commercially available rotary vacuum feed-through devices (30) mounted in the chamber walls (28) and the separable, zero backlash couplings (44) located within the chamber. These couplings (44) allow easy removal and replacement of the handling mechanism without the need for physical access and tools.

2 Claims, 2 Drawing Sheets

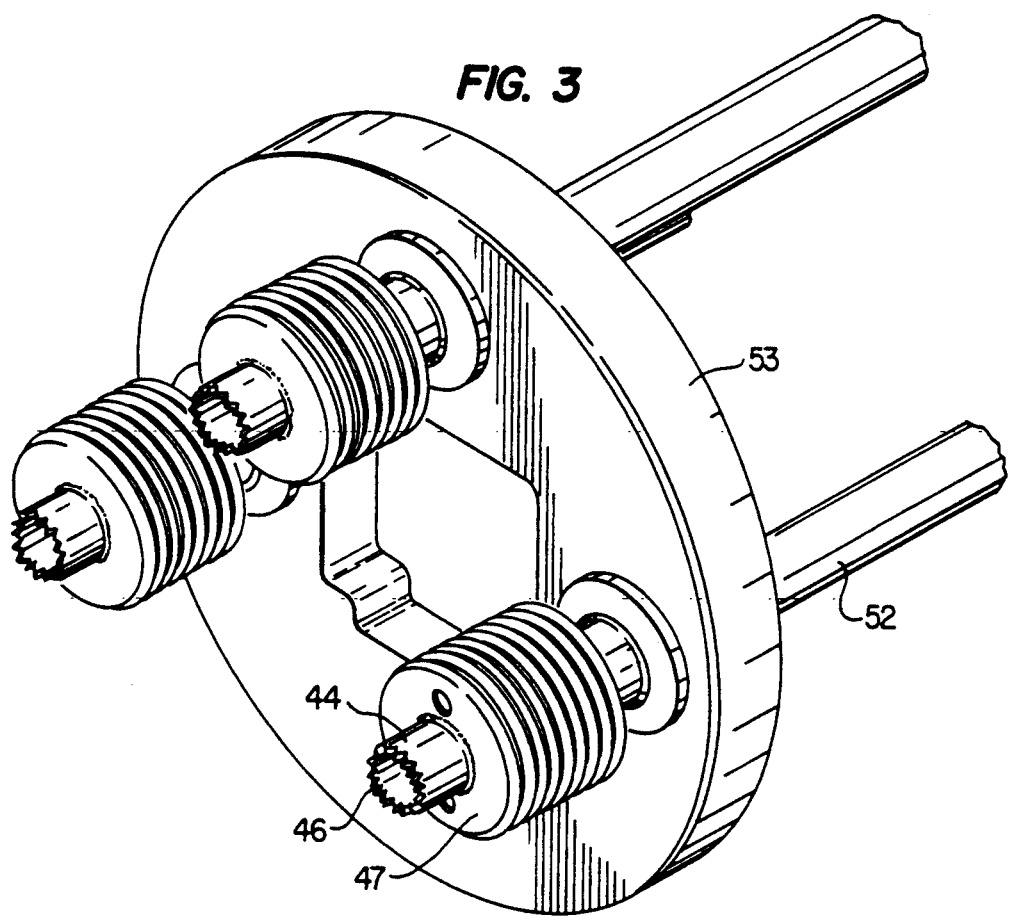
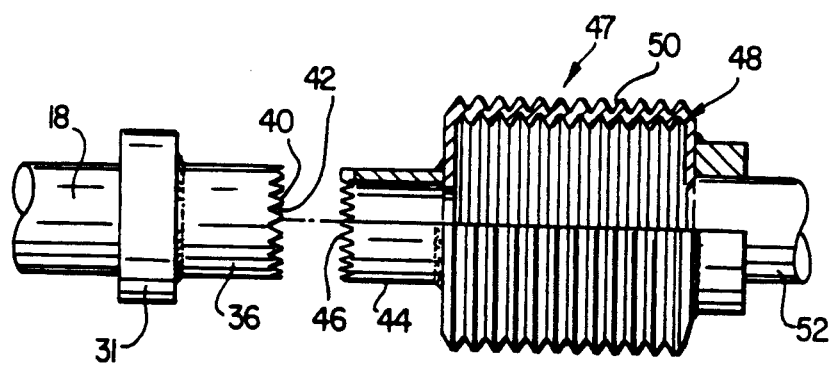

METHOD OF FLEXIBLY COUPLING A DRIVE SHAFT

This is a continuation of application Ser. No. 07/091,188, filed Aug. 31, 1987, now U.S. Pat. No. 4,881,922.

TECHNICAL FIELD OF THE INVENTION

This invention relates in general to separable drive couplings and in particular, to a separable drive coupling using a metal bellows.

BACKGROUND OF THE INVENTION

In semiconductor vacuum processing, evacuated process chambers generally include mechanical devices for accurately handling and moving semiconductor slices therein. In such chambers, it is desirable to minimize the material handling mechanisms that must be located inside the chambers To accomplish this, it is preferable to locate the necessary power elements such as motors outside the chamber. Power must then be transmitted from the power elements to the mechanism by couplings such as vacuum feed-through devices. In order to enable cleaning or repair of the internal driven mechanism, it is desirable to have a separable coupling which will allow removal of the driven mechanism from the power elements.

Separable couplings are currently available, but due to their design characteristics, they require clearance between their mating parts to allow them to be separated. This clearance may be unimportant when the coupling is used only as a power transmitting device. However, when shaft positioning is critical, as it is in mechanical handling devices for semiconductor vacuum processing, this clearance results in backlash between the driving and driven shafts that decreases the accuracy of the driven shaft's rotary position.

Thus, a need has arisen for a separable shaft coupling with zero backlash that can be coupled and uncoupled in an area such as semiconductor vacuum processing where visual and physical access to the coupling is impractical or undesirable.

SUMMARY OF THE INVENTION

The present invention disclosed and claimed herein describes a method and apparatus for an improved separable drive coupling which substantially eliminates problems associated With prior coupling devices. The present invention allows the removal of a vacuum encased driven mechanism from a driving mechanism which is open to atmospheric conditions, without creating backlash problems.

In accordance with one aspect of the invention power is transmitted from the power element through rotary vacuum feed-through devices extending into a vacuum chamber. Attached to the feed-through devices within the vacuum chamber is a zero backlash coupling comprised of two meshing components. The first meshing component is fixably attached to the feed-through device, and the second meshing component is attached to a flexible metal bellows which is in turn attached to the driven mechanism.

It is a technical advantage of this invention that the driven mechanism can be coupled and uncoupled from the power element without a need for any additional openings in the vacuum chamber for tool access. This provides a better vacuum chamber due to fewer areas requiring a seal.

There is a further technical advantage of the present invention in the provision of meshing teeth which allow self-alignment of the coupling portions as well as preventing backlash.

An additional technical advantage is provided by the design of the meshing teeth in the coupling portions. The teeth are designed to serve as an overload clutch in the event a malfunction prevents rotation of the driven shaft. Sloping angular surfaces of the teeth will slide in relation to each other if excessive rotational force is applied, causing the coupling to disengage and preventing possible damage.

BRIEF DESCRIPTION OF THE DRAWINGS

For a more complete understanding of the present invention and for further advantages thereof, reference is now made to the following Detailed Description taken in conjunction with the accompanying drawings in which:

FIG. 2 is a cross-sectional view of the preferred embodiment of the bellows of the present invention; and FIG. 3 is a perspective view of the driven portion of the coupling device attached to the metal bellows.

DETAILED DESCRIPTION OF THE INVENTION

Figure 1:
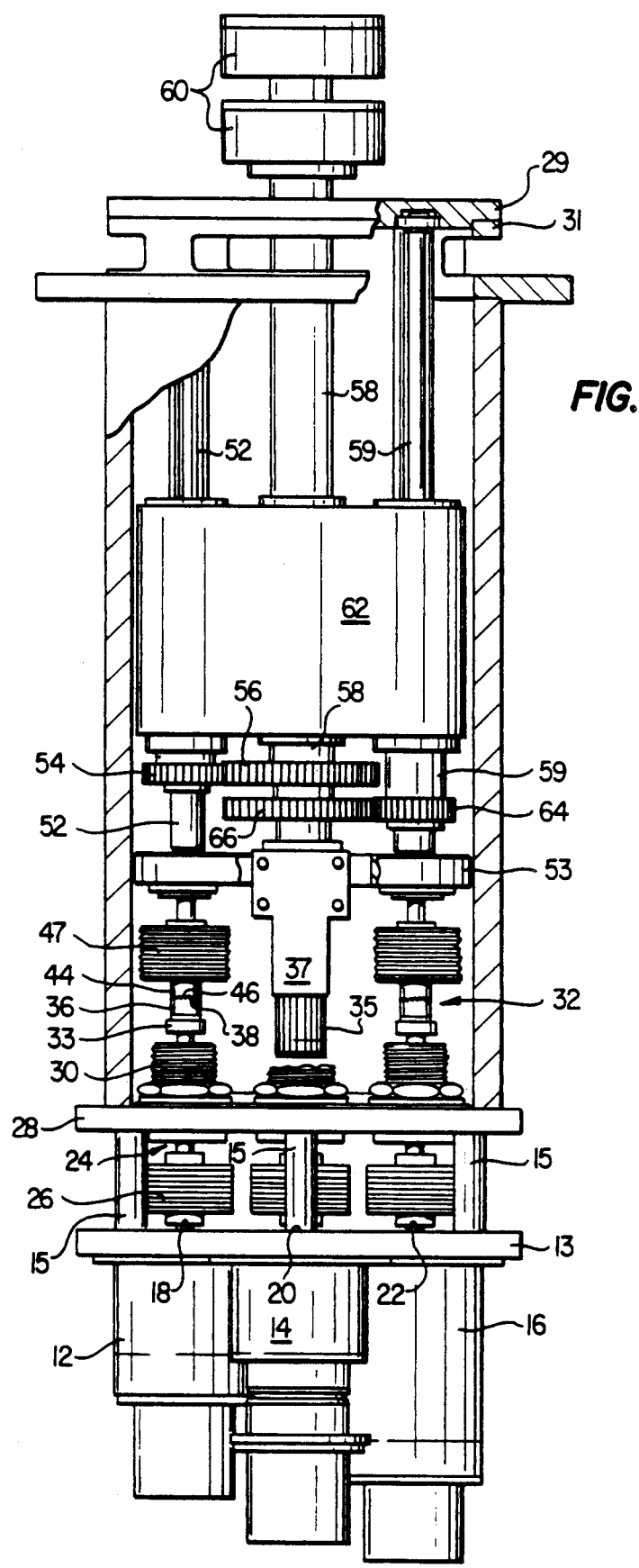
FIG. 1 is a cross-sectional view of a mechanism incorporating the present invention.

Referring to FIG. 1, the separable coupling of the present invention is shown in a semiconductor vacuum robot arm which is generally identified by reference numeral 10.

The robot arm 10 is driven by electrical drive motors 12, 14 and 16. Each of the drive motors 12, 14, and 16 provide rotational motion to their associated drive shafts 18, 20 and 22. The drive shafts 18, 20 and 22 extend throughout the robot arm 10 through various devices which will be subsequently described in more detail. The drive shafts 18, 20 and 22 each have identical associated connections throughout the robot arm 10. The descriptions that follow will, for the sake of clarity, be addressed to drive shaft 18 only. It is to be understood that, unless otherwise stated, the drive shafts 20 and 22 can be described in the same manner.

The drive shaft 18 may be seen to extend from motor 12 through a support plate 13 into a chamber 24 and is coupled to the lower end of a flexible metal bellows 26. The metal bellows 26 is provided to compensate for any misalignment between the drive shaft 18 and its continuation through a lower plate 28. Support posts 15 are provided to separate the support plate 13 from the lower plate 28.

The chamber 24 is not vacuum sealed and is, therefore, open to atmospheric conditions. The upper end of bellows 26 is coupled to an extension of shaft 18, the extension being connected to a rotary vacuum feed-through device 30. The rotary vacuum feed-through device 30 allows driving motion to be passed through the lower plate 28 into a vacuum chamber 32. The rotary vacuum feed-through device 30 is a ferro-fluidic seal of standard design and is well known in the art. The vacuum chamber 32 is enclosed by a cylindrical outer wall 34, the lower plate 28 and the upper plate 29. The cylindrical outer wall 34 is attached to the lower plate 28 such as, for example, by welding. The upper plate 29 is removably attached to the flange 31 of the cylindrical outer wall 34 by any appropriate method such as by bolts (not shown). Sealing devices (not shown) are provided as required to enable an air tight seal within the chamber 32.

The feed-through device 30, being of standard design, is pre-fitted with a shaft passing through it (shown in FIG. 1 as a continuation of the drive shaft 18). In order to connect the drive shaft 18 to the feed-through device 30 the metal bellows 26 is provided. The metal bellows 26 will allow for any axial or radial misalignment of the drive shaft 18 while preventing any rotational discontinuities as will be explained in more detail below.

Attached to the rotary vacuum feed-through device 30 by a support stand 33 is a first coupling portion 36. The first coupling portion 36 has protruding teeth 38.

Directly opposite the first coupling portion 36 is a second coupling portion 44. The second coupling portion 44 has protruding teeth 46 designed so as to tightly mesh with the protruding teeth 38.

As best shown in FIG. 2, the protruding teeth 38 are shown to be wedge shaped with oppositely sloping portions 40 and 42. It is to be understood, however, that the protruding teeth 38 may be of various other shapes, such as serrated. The teeth 38 and the teeth 46 are preferably duplicates of each other, although they may, however, be shaped differently from each other. Any appropriate shape that provides the desired advantages of positive mesh and overload protection (as will be described below) can be used.

Referring both to FIGS. 1 and 2, the second coupling portion 44 is fixedly attached by welding or the like to a flexible metal bellows 47. The flexible metal bellows 47 (identical to flexible metal bellows 26) is provided to compensate for any misalignment between the first coupling portion 36 and the second coupling portion 44. This misalignment may be due to any discontinuities in the drive shaft 18. The metal bellows 47 compensates for axial or radial misalignment.

The flexible metal bellows 47 can best be seen in FIG. 2 in partial cross-section The bellows 47 is hollow, forming a void 48. The bellows 47 has an accordion shaped side 50 rather than a spiral or coiled shape as is found in springs. The bellows 47 can, therefore, expand or contract in an axial direction but cannot twist into a tighter or looser coil. The bellows 47 thus provides a flexible coupling that will compensate for axial displacement or wobble but will not allow rotational discontinuities.

As depicted in FIGS. 2 and 3, the second coupling portion 44 is preferably welded to the bellows 46. Other methods of fixing the second coupling portion 44 to the bellows 47 are acceptable and could include, for example, threadably attaching the two pieces.

The bellows 47 is preloaded in compression to provide intimate contact between the teeth 38 of the first coupling portion 36 and the teeth 46 of the second coupling portion 44.

The technical advantages provided by the bellows 47 could also be achieved by substituting other flexible portions for the bellows 47. Any flexible device that provides a flexible load that compensates for axial displacement and wobble and prevents rotational discontinuities would be acceptable.

Due to the design of the protruding teeth 38 and 46, there is a positive fit between their respective sloping portions. The teeth 38 and 46 interlock with virtually no space between any of their adjacent parts. This provides an additional advantage of the invention in that backlash is prevented.

Backlash is the play between adjacent movable parts when there is extra space. Backlash can often be seen between the teeth of gears. This play is undesirable in semiconductor vacuum processing, as accurate movements in thousandths of an inch are necessary to properly align processing devices with the semiconductor slices.

The sloping portions of the teeth 38 and 46 also provide an additional advantage as a type of clutch for overload protection. Should any conditions arise in which the drive shaft 18 cannot turn freely, any further damage will be prevented. If the shaft 18 is jammed somewhere, the sloping portions of the teeth 38 and 46 will slide away from each other and thus disengage By disengaging the teeth 38 and 46 from each other further possible damage, for example, to the motor 12, is prevented.

Referring again to FIG. 1, a driven shaft 52 is connected to the upper portion of bellows 47. The driven shaft 52 passes through suitable bearings in a support plate 53. The driven shaft 52 has an attached first gear 54 which is meshed with a second gear 56. Gear 56 is, in-turn, attached to a driven shaft 58. The driven shaft 58 is a continuation of drive shaft 20 and a driven shaft 59 is a continuation of the drive shaft 22. The driven shaft 59 has an attached first gear 64 which is meshed with a second gear 66. Gear 66 is, in-turn, attached to the driven shaft 58. The various gears and shafts (for example, gears 54 and 56 and shafts 52 and 58) provide rotational and up-and-down movement for the robot arm 10 and its output arms 60 The output arms 60 do the desired work of the robot arm 10, such as semiconductor vacuum processing.

Also shown in FIG. 1 is an electrical conduit 35 which provides electrical control for the robot arm 10. The electrical conduit 35 is attached to the support plate 53 by a bracket 37. The driven shafts 52, 58 and 59 pass through a shaft housing 62. The shaft housing 62 provides rotational support to the driven shafts 52, 58 and 59 by appropriate devices (not shown) The driven shaft 58 passes through the upper plate 29 and an appropriate bearing (not shown) and is connected to the output arms 60. The driven shafts 52 and 59 are rotationally connected to the upper plate 29 by appropriate bearings (not shown).

in operation, the technical advantages of the coupling portions 36 and 44 become apparent. The coupling portions 36 and 44 may be meshed without need for visual inspection. Due to the flexible metal bellows 47, any misalignment between the drive shaft 18 and the driven shaft 52 is compensated for.

To service the robot arm 10, the upper plate 29 is removed from the flange 31 such as by unscrewing bolts (not shown). The drive shaft 18 is then easily uncoupled from the driven shaft 52 by lifting the upper plate 29 and all its associated parts, including second coupling portion 44. The second coupling portion 44 is thus separated from the first coupling portion 36.

After servicing, the upper plate 29 is placed in position and attached to the flange 31. Due to the shape of the matching teeth 38 and 46, the driven shaft 52 is easily recoupled to the drive shaft 18. Of course, matching teeth on the other two drive shafts also mesh in the same manner No tools or visual inspections are needed to ensure alignment.

It is thus possible to provide a vacuum within the cylinder 34 without extraneous openings. It is also possible to provide a positive, backlash free, transfer of rotational movement throughout the robot arm 10. Axial misalignment and wobble are compensated for and overload protection is supplied.

Although the present invention has been described with respect to a specific preferred embodiment thereof, various changes and modifications may be suggested to one skilled in the art and it is intended that the present invention encompass such changes in modifications as fall within the scope of the appended claims.

What is claimed is:

1. A method for separably coupling a drive in a semiconductor vacuum processor comprising:

driving one end of a drive shaft in atmospheric pressure to cause rotation of an opposite end of the drive shaft in an area of reduced pressure;

coupling one end of a coupling portion of a driven shaft with said opposite end of said drive shaft within said area of reduced pressure by meshing protruding teeth on said drive shaft with protruding teeth on said coupling portion of said driven shaft, thus providing rotation of said driven shaft while allowing ease of separation of said shafts; and compensating for any misalignment between said drive shaft and said driven shaft while providing rotation to said driven shaft by attaching a flexible metal bellows between said coupling portion and said driven shaft such that axial or radial misalignment between the drive shaft and the driven shaft is compensated for, without any rotational discontinuity between the drive shaft and the driven shaft.

2. A method for separably coupling a drive extending between an area of atmospheric pressure and an area of reduced pressure, comprising the steps of:

sealingly passing a portion of a drive shaft from atmospheric conditions to an area of reduced pressure;

driving an end of the drive shaft in atmospheric pressure to cause rotation of an opposite end of the drive shaft in the area of reduced pressure;

coupling one end of a coupling portion of a driven shaft with the opposite end of the drive shaft within the area of reduced pressure by meshing protruding teeth on the drive shaft with protruding teeth on the coupling portion of the driven shaft, thus allowing rotation of the driven shaft while allowing ease of separation of said shafts; and attaching a flexible metal bellows between the coupling portion of the driven shaft and the driven shaft to compensate for radial or axial misalignment between the drive shaft and the driven shaft, such that there is no rotational discontinuity between the drive shaft and the driven shaft.

* * * * *